US012669785B2

(12) United States Patent
Eberle et al.

(10) Patent No.: US 12,669,785 B2
(45) Date of Patent: Jun. 30, 2026

(54) METHOD AND SYSTEM FOR CONTROLLING A PUMP

(71) Applicant: Grundfos Holding A/S, Bjerringbro (DK)

(72) Inventors: Simon Eberle, Bjerringbro (DK); Michael R. S. Hansen, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 420 days.

(21) Appl. No.: 18/021,769

(22) PCT Filed: Aug. 17, 2021

(86) PCT No.: PCT/EP2021/072815
§ 371 (c)(1),
(2) Date: Feb. 16, 2023

(87) PCT Pub. No.: WO2022/038125
PCT Pub. Date: Feb. 24, 2022

(65) Prior Publication Data
US 2024/0027975 A1     Jan. 25, 2024

(30) Foreign Application Priority Data
Aug. 18, 2020     (EP) .................................... 20191568

(51) Int. Cl.
*G05B 13/02*     (2006.01)
*G01M 13/00*     (2019.01)
(52) U.S. Cl.
CPC ......... *G05B 13/0265* (2013.01); *G01M 13/00* (2013.01)

(58) Field of Classification Search
None
See application file for complete search history.

(56) References Cited

U.S. PATENT DOCUMENTS 6,947,870 B2     9/2005   Zhu et al.
9,823,627 B2     11/2017   Acosta Gonzalez
(Continued)

FOREIGN PATENT DOCUMENTS

CN     101556457 A     10/2009
CN     201506796 U     6/2010
(Continued)

OTHER PUBLICATIONS

Translation of WO-2013040853-A1 (Year: 2013).*
(Continued)

*Primary Examiner* — Ryan A Jarrett
(74) *Attorney, Agent, or Firm* — ICE MILLER LLP; Justin D. Swindells

(57) ABSTRACT
A computer-implemented method for determining one or more application-specific control parameters of a pump operating in a system for moving a fluid. The method includes monitoring one or more operational variables of the pump during operation of the pump in the system; applying a trained machine-learning model to automatically determine an application type from the monitored operational variables, the application type representing a type of system the pump operates in and/or representing a type of operation performed by the pump when operating in said system, each application type being associated with a respective set of one or more application-specific control parameters; controlling the pump based on the set of one or more application-specific control parameters associated with the determined application type.

17 Claims, 9 Drawing Sheets

(56) References Cited

U.S. PATENT DOCUMENTS

| | | | |
|---|---|---|---|
| 10,254,926 B2 * | 4/2019 | Miles | .................. G05B 19/042 |
| 2016/0222972 A1 | 8/2016 | Nuhn | |
| 2016/0245273 A1 | 8/2016 | Wagner | |
| 2017/0268517 A1 | 9/2017 | Mangutov | |
| 2018/0087496 A1 | 3/2018 | Cheng et al. | |
| 2018/0291895 A1 | 10/2018 | Afshari | |
| 2022/0057784 A1 * | 2/2022 | Zhang | ................ G05B 19/4188 |

FOREIGN PATENT DOCUMENTS

| | | | | |
|---|---|---|---|---|
| CN | 103016321 A | 4/2013 | | |
| CN | 108266385 A | 7/2018 | | |
| CN | 109829248 A | 4/2019 | | |
| EP | 2610693 A1 | 7/2013 | | |
| EP | 3376315 A1 | 9/2018 | | |
| EP | 3438567 A1 | 2/2019 | | |
| EP | 3690758 A1 | 8/2020 | | |
| WO | WO-2013040853 A1 * | 3/2013 | ............ F04B 49/065 | |
| WO | WO-2022018974 A1 * | 1/2022 | | |

OTHER PUBLICATIONS

1 Examination Report in EP 20191568.3, Feb. 7, 2024, 5 pages.
International Search Report and Written Opinion of International
Searching Authority for International Patent Application No. PCT/
EP2021/072815, mailed Dec. 2, 2021 (11 pages).

* cited by examiner

METHOD AND SYSTEM FOR CONTROLLING A PUMP

CROSS-REFERENCE TO RELATED APPLICATIONS

This application is a U.S. National Stage of International Application No. PCT/EP2021/072815, filed Aug. 17, 2021, which claims the benefit of and priority to European Patent Application No. 20191568.3, filed Aug. 18, 2020, both of which are incorporated herein by reference in their respective entireties.

TECHNICAL FIELD

The present disclosure relates to a method and system for controlling a pump.

BACKGROUND

Pumps are widely used in different technical areas and for a wide variety of applications, such as in water supply systems, fluid-based heating systems, waste water systems, and/or the like.

Many pumps are designed for use in a variety of applications. Such pumps are often configurable and allow certain control parameters, such as a pump speed, to be selected. In particular, some pumps may selectively be operable in different control modes, i.e. one or more control parameters may be associated with a selected one of a plurality of available control modes.

In many applications, it is desirable to set or adjust the control parameters of a pump so as to match the control parameter settings to the specific application in which a pump is to be operated. Typically, during manufacturing, each pump is provided with a factory setting that includes default settings of the control parameters. The control parameters may subsequently be adjusted, e.g. during installation of the pump in a specific application. However, in order to properly adapt the control parameters to the specific application, the user, e.g. a service technician, needs to know how to adjust the control parameters and what choice of control parameter settings is suitable for the specific application. Moreover, manual adjustment of control parameters is time consuming. Therefore, in practice, pumps are often installed without proper adjustment of the control parameter settings to the specific application in which the pump is to be used. Instead, they are often merely used with the original factory settings or with a setting that is suboptimal for the specific application. This may result in suboptimal operation, e.g. in suboptimal pump performance, or even malfunctions, unnecessarily high power consumption, unnecessary wear and/or unnecessarily shortened lifetime of the pump and/or of other system components of the system in which the pump operates.

EP3376315 discloses a configuration method for a speed-controllable centrifugal pump unit in a hydraulic system, which can be used in different types of systems and can be operated in a number of different control modes with respective control configurations. This prior art method uses a configuration assistant executed on a configuration device that allows a user to select one of a number of predetermined system types and that has stored thereon control modes associated with the respective system types. However, this method still requires a user to select a system type, i.e. it requires manual input and knowledge of the correct system type.

It remains desirable to provide a more efficient and reliable method for controlling a pump that is easy to use even for an untrained user.

SUMMARY

According to one aspect, disclosed herein are embodiments of a computer-implemented method for determining one or more application-specific control parameters of a pump operating in a system for moving a fluid, the method comprising:

monitoring one or more operational variables of the pump during operation of the pump in said system;

applying a trained machine-learning model to automatically determine an application type from the monitored operational variables, the application type representing a type of system the pump operates in and/or representing a type of operation performed by the pump when operating in said system, each application type being associated with a respective set of one or more application-specific control parameters;

controlling the pump based on the set of one or more application-specific control parameters associated with the determined application type.

Accordingly, the method automatically determines the type of application in which the pump is operating. The method may further, automatically or in a user-assisted manner, determine a set of application-specific control parameters matching the determined type of application. The method may thus comprise determining the set of application-specific control parameters from the determined application type; alternatively, the method may directly determine the set of application-specific control parameters that are associated with an application type.

A correct identification of the application type allows for better optimization of the pump operation and, optionally, of the system as a whole. Additionally, a correct identification also facilitates more accurate services to the pump operator, e.g. maintenance services or system analytics.

The application type may be indicative of a type of system the pump is a part of and operates in, i.e. determining the application type may comprise a system identification of the system which the pump is a part of. Alternatively or additionally, the application type may be indicative of a type of operation the pump is performing within a system. A type of system may be, but is not limited to, a heating system, a cooling system, a drinking water system. Examples of types of systems may include a hierarchy of system types, e.g. including more general system types as well as subtypes of one or more of the general system types; e.g. radiator system, underfloor heating system, boiler system, mixing loop, raw water intake systems, wastewater treatment plants, municipality pumping stations, etc.

Different application types correspond to different tasks performed by the pump in said application. The differences can be in what kind of fluid is being pumped and/or what operational parameters or control strategies are most important in relation to solving said task, e.g. keeping a pressure, keeping a minimum temperature, what start/stop pattern is desired or avoiding start/stop modes and adjusting continuous operation.

The control parameters may include any set of one or more control parameters that are used to control a pump. Generally, reference to application-specific control parameters refers to settings or values of these control parameters which are selected for control of the pump in a given application type.

Examples of application-specific control parameters include set points, target values and/or other set values of one or more operational variables when the pump is operated in a certain application type, such as set points, target values and/or other set values of a pressure, a flow and/or a rotational speed (RPM). For example, an application-specific control parameter may define how fast the pump should run when operated in a given application, what pressure or flow should be achieved, and/or the like. Further examples of an application-specific control parameter may include a constant in an equation, e.g. where the equation describes relations between two or more operational variables, such as target relations for the operational variables when the pump is operated in a given application type; for example, an application-specific control parameter may define that, if the flow increases by 1 m³/h, then the pressure should be increased with 0.5 bar. Yet further examples of an application-specific control parameter include an application-specific set of one or more PID values, such as PID values describing how fast the pump should regulate and/or how much overshoot is desired.

The set of one or more application-specific control parameters may be determined directly by the machine-learning model, i.e. the set of application-specific control parameters may itself be a representation of an application type. Alternatively or additionally, the application-specific control parameters may be determined, in particular selected, based on an identification of an application type that is output by the machine-learning model. For example, the machine-learning model may be trained to output one or more class identifiers, each class identifier being associated with a corresponding application type. The process may then determine, e.g. select, a set of application-specific control parameters matching the determined application type. This determination of the application-specific control parameters may e.g. be performed as a look-up in a look-up table, To this end, the look-up table may include a plurality of application types and, for each application type, a set of corresponding application-specific control parameters.

It will be appreciated that a set of application-specific control parameters may be represented as a set of individual parameter values of the respective application-specific control parameters of the set. In some embodiments, one or more sets of application-specific control parameters may collectively be represented as respective control modes, where each control mode represents a set of one or more application-specific control parameters for controlling a pump in a given application type. Accordingly determining a set of application-specific control parameters may include determining, in particular selecting, an application-specific control mode. For example, an application-specific control mode may be determined directly by the machine-learning model, i.e. the application-specific control mode, optionally including application-specific values of reference or target values of one or more operational variables associated with the control mode, may itself be a representation of an application type. Alternatively or additionally, the application-specific control mode, optionally including application-specific values of reference or target values of one or more operational variables associated with the control mode, may be determined, in particular selected, based on an identification of an application type output by the machine learning model as described herein.

Examples of control modes may include one or more of the following control modes:
    a proportional pressure control mode
    a constant pressure control mode a constant speed control mode
    an on/off control mode
    and/or the like.

For example, a proportional pressure control mode may define application-specific values of a reference pressure, a pressure at zero flow and a rate of change for pressure versus flow. Similarly, a constant pressure control mode may define an application-specific pressure reference. Yet similarly, a constant speed control mode may define an application-specific speed reference. An on/off control mode may define an application-specific level reference and a hysteresis band.

In some embodiments, monitoring comprises obtaining a time series of values of the one or more operational variables at respective points in time. It will be appreciated that operational variables may vary at different time scales. Accordingly, not all operational variables may need to be monitored at the same time intervals or at the same monitoring frequency. While some operational variables may be monitored a short time intervals, e.g. every minute or second, other operational variables may be monitored more infrequently, e.g. on an hourly basis, once a day or even only once during the entire monitoring period.

The monitored operational variables may be indicative of an operational state of the pump motor and/or be indicative of properties of the fluid being moved by the pump. In particular, the monitored operational variables may include a directly measurable operational variable of the pump motor or a quantity derived from one or more measurable operational variables of the pump motor. Examples of operational variables of the pump motor include a frequency or rotational speed of the pump motor, a power, in particular an electrical power, of the pump motor, an electrical drive current fed into the pump motor, an energy consumption of the pump motor, etc. Examples of a quantity derived from one or more directly measurable operational variables of the pump motor include a linear combination of multiple directly measurable operational variables, a polynomial of one or more directly measurable operational variables, a root of such a polynomial, an analytical estimate of a flow rate calculated from one or more directly measurable operational variables of the pump motor, etc. Examples of additional or alternative operational variables of the pump motor include a temperature of the motor electronics, a temperature of the pump motor, etc.

For many pumps, some or all of the above operational variables of a pump may easily be obtained, e.g. directly from a drive circuit of the pump motor, or they can otherwise readily be obtained without complicated modifications of the pump motor or drive circuit and without the need for expensive sensors, such as hydraulic sensors. Nevertheless, in some embodiments, the monitored operational variables include quantities monitored by suitable sensors that may be integrated into the pump or that may be external to the pump, e.g. sensors that are communicatively coupled to a control unit of the pump. Examples of such sensors include a flow sensor, a temperature sensor, a pressure sensor, etc.

Examples of operational variables indicative of a property of the fluid being moved may include one or more of the following operational variables: a temperature of the fluid, a flow rate indicative of a rate of flow through the pump, a pressure of the fluid being moved, e.g. a pressure upstream and/or downstream of the pump, etc. Generally, the fluid moved by the pump may be a gas, such as air, or a liquid, such as water, waste water, etc. Some or all of the operational variables may be measured by suitable sensors while other operational variables may be estimated, e.g. based on other operational variables.

In some embodiments, when the monitoring results in one or more time series of one or more operational variables, the obtained time series may be used directly as an input to the machine-learning model. Alternatively or additionally, the process may pre-process the time series, e.g. so as to compress the data, reduce the dimensionality of the data, to extract features from the data, and/or the like. Accordingly, in some embodiments, the input to the machine-learning model may include summary statistics representing statistical properties of the data that has been acquired during the monitoring.

The machine-learning model may receive operational variables and, optionally additional input data as input data. The additional input data may include static data that does not vary during the monitoring of operational variables or it may be dynamic data that changes during the monitoring. Examples of static data include information about the pump, such as a pump identifier, a pump type, static operational settings of the pump, an installation size (e.g. as indicated by the number of nearby pumps or by another suitable measure), image data showing a picture or other image data of the pump as part of a hydraulic installation, GPS data or other positional data indicative of a geographic position of the pump, such as a postal code, a country, time of year, and/or the like.

Further examples of additional input data include information about current control settings of the pump, e.g. about a current control mode of the pump (e.g. constant pressure mode, proportional mode, etc.), one or more currently selected set points, a selected flow limit, weather data or other environmental data, etc.

In one embodiment, the input data received by the process includes the following: pump serial number, pump type, power consumption, control mode, flow rate and pump speed.

In some embodiments, the machine-learning model may receive at least some information about the system the pump is installed in. In some embodiments, the processing unit of the pump or an external data processing system may receive sensor data from other parts of the system in which the pump operates, the other part being different from the pump. Examples of such sensor data may be indicative of a pressure, a temperature, a flow rate, a valve position, etc. The machine-learning model may thus also receive such sensor data as additional input data.

In some embodiments, the process may include capturing one or more images of the pump and, optionally, of one or more other components of the system, e.g. components to which the pump is connected. The one or more images may e.g. be captured by a camera of the data processing system implementing the machine-learning model or by a camera communicatively coupled to the data processing system. The images may e.g. be taken using a smartphone or tablet computer executing an app. The app may be operable to provide guidance about how the images should be taken in order to ensure that the components of the system are shown in a relevant context. The process may include performing image processing of the captured one or more images so as to recognize one or more image features of the one or more captured images. The captured one or more images, or a processed version of the one or more processed images, may be used as additional inputs to the machine-learning model.

Examples of images of the system may include one or more photos of the installation which the pump is a part of, one or more 3D scans and/or IR scans of the installation the pump is a part of. The images may be processed by an image recognition process that can recognize different types of installations, e.g. based on a recognized pipe topology, based on recognized components other than the pump, etc. The image recognition process may include a trained machine-learning model which may be trained based on images of known/typical installations.

In some embodiments, monitoring comprises monitoring over at least a predetermined period of time, such as at least 1 h, such as at least 6 h, such as at least 12 h, such as at least 24 h. Monitoring over at least a predetermined period of time ensures that the values obtained during the monitoring are sufficiently representative and cover regular variations of operational variables in the specific application, e.g. over the course of a working day, over the course of 24 h or for another suitable cycle time. In some embodiments, data from at least 24 hours of operation may need to be collected in order to capture a pattern of daily consumption cycles. An initial classification may be based on time series after 24 hours or after another suitable initial monitoring period. The initial classification may subsequently be updated as more data becomes available.

Accordingly, in some embodiments, the monitoring may be performed over an initial period of time resulting in an initial set of monitored operational variables. The process may apply the trained machine-learning model to the initial set of monitored operational variables to determine an initial application type. The process may then monitor the one or more operational variables over an additional period of time resulting in an extended set of monitored operational variables. Optionally, during the additional period of time, the pump may be controlled based on a set of application-specific control parameters associated with the determined initial application type. The process may then apply the trained machine-learning model to the extended set of monitored operational variables to determine a refined application type. The pump may then be operated based on application-specific control parameters associated with the refined application type. This process may be repeated several times. In particular, in some embodiments, determining an initial application type may comprise a corresponding confidence level associated with the initial set of monitored data and/or the initial application type. The process may compare the confidence level with a threshold value and, if the confidence level is smaller than the threshold value, the process may monitor the one or more operational variables over an additional period of time resulting in an extended set of monitored operational variables. In one embodiment, during the additional period of time, the pump may either be operated based on a previous set of operational variables, e.g. based on a default or factory setting, or based on a set of application-specific control parameters associated with the determined initial application type. The process may base the selection of either the previous set of control parameters or the application-specific control parameters associated with the initial application type on the determined confidence level. For example, if the confidence level is below a minimum level, the process may operate the pump during the additional period based on the previous control parameter. If the confidence level exceeds the minimum level, the process may control the pump during the additional period based on the application-specific control parameters associated with the determined initial application type. In any event, the process may then apply the trained machine-learning model to the extended set of monitored operational variables to determine a refined application type. This process may be repeated several times, e.g. until the confidence level reaches or exceeds the threshold value or until another condition is fulfilled, e.g. until a predetermined maximum number of repetitions has been performed.

The monitoring may be performed during an initial set-up process or during normal operation of the pump. During the monitoring, in particular during the monitoring over an initial period of time, the pump may be operated with a current set of control parameters. The current set of control parameters may be a factory setting or a set of application-specific control parameters previously selected, e.g. during a previous application of an embodiment of the method described herein.

In some embodiments, the classification may be improved by operating the pump in a special control mode (e.g. a set-up mode), where the pump is run in different operating modes and/or based on different set points to investigate the system responses and thereby obtain an improved data set for the classification. Accordingly, in some embodiments, monitoring comprises:

monitoring the one or more operational variables while the pump is operated based on at least a first set of control parameters, monitoring the one or more operational variables while the pump is operated based on at least a second set of control parameters, different from the first set of control parameters, and optionally monitoring the one or more operational variables while the pump is operated based on at least one further set of control parameters.

For example, the system may selectively be set into each of a plurality of different control modes, and the operational variables may be monitored during operation in each of the plurality of control modes. The data acquired during operation in these different control modes may then be used by the machine-learning model to determine the application type and, hence, to determine an optimal mode of operation.

The machine-learning model may be trained to map one or more monitored operational variables to a corresponding one of a plurality of classes, each class of the plurality of classes being associated with a respective application type. During training, the classes may be predetermined, known classes of applications and the training may include supervised learning. Alternatively, the classes may a priori be unknown and instead be defined during the training process. In this case, the training process may include unsupervised learning. When using unsupervised learning, the machine-learning model may be trained by an unsupervised clustering algorithm to map a set of monitored operational variables to a corresponding one of a plurality of clusters. Unsupervised learning may include clustering, such as K-means clustering, and the classes may be defined as respective clusters in a suitable input space representing the input parameters of the clustering process, e.g. of the monitored operational variables. Generally, examples of suitable machine-learning models include k-means clustering, auto encoders, T/SNE, PCA, support vector machines (SVA), decision trees and neural networks.

The training of the machine-learning model may be based on training data that includes monitored operational variables from one or more pumps, operated in respective types of applications, i.e. in respective pump applications. In particular when employing supervised learning, the training data may further comprise respective class identifiers that identify the respective application type in which the pump was operated when obtaining the respective monitored operational variables. Generally, the training data should be representative of different types of applications. The training algorithm is operable to create a machine-learning model configured to separate different classes or clusters of monitored operational variables in a suitable input space, in particular in a high-dimensional space of observations. The underlying meaning of the clusters is not necessarily known beforehand but the clusters may have a similar characteristic. Examples of different application types may include "Hot water", "Boiler pump", "Fan coil unit", "Radiator system one pipe/two pipe", "Underfloor heating", "Air handling unit", "Cooling", and/or the like. It will be appreciated that other embodiments may include alternative and/or additional application types.

When the training includes unsupervised learning, the training process may be configured to determine different subsets of the training data, e.g. different clusters of training data when represented in a suitable space. The unsupervised learning may be based on the monitored operational training data alone, i.e. the unsupervised learning is not based on known class identifiers identifying the respective application type in which the pump was operated when obtaining the respective monitored operational variables. The different subsets or clusters resulting from the unsupervised training process may then manually be mapped to respective application types. The resulting trained machine-learning model may thus be configured to map a set of monitored operational variables to one of the subsets or clusters. The process may then further be configured to map the subset or cluster to which the monitored operational variables were mapped to a corresponding set of one or more application-specific control parameters. The use of unsupervised learning facilitates identification of a priori unknown application types, e.g. sub-types of known application types. It is the training algorithm that performs the clustering. The resulting clustering might not be as a priori expected. For example, two seemingly very different applications might be combined into the same cluster, or one of a priori known applications might be split up into one or more sub-clusters.

Alternatively, in supervised learning, the model is trained to map the observations to a priori known classes. Accordingly, when the training includes supervised learning, the training process may be based on the monitored operational data and on corresponding known class identifiers identifying the respective application type in which the pump was operated when obtaining the respective monitored operational variables. The supervised training process is configured to provide a trained machine-learning model that maps monitored operational variables to respective ones of the class identifiers.

In some embodiments, the process comprises a verification step, e.g. a rule-based verification step. The verification step may compare the application type determined by the trained machine-learning model with one or more parameters, e.g. with known attributes of the pump or of the system in which the pump is installed, with one or more attributes of the monitored operational variables, with a previously determined application type for the same pump, and/or the like. Based on the comparison, the verification step may confirm the determined application type or reject the determined application type. The verification step may include a user-input indicative of an approval by the user or of a rejection by the user of the determined application type. In such embodiments, only approved application types may subsequently be used for selecting matching application-specific control parameters for controlling operation of the pump. In some embodiments, if the verification step results in rejection of the determined application type, the process may react in one of a number of possible ways. For example:

the process may select a default set of control parameters, the process may request a user-input for confirming the determined application type and/or for selecting an alternative application type;

the process may repeat the automatic determination, e.g. based on a different, e.g. an extended set of monitored operational variables.

For example, certain application types may be incompatible with certain types of pumps. In one embodiment, the verification step compares the set of application-specific control parameters associated with the determined application type with the available control modes of the pump. Only if the set of application-specific control parameters associated with the determined application type matches the available control modes, the verification step selects said set of application-specific control parameters.

In some embodiments, the trained machine-learning model is implemented by the pump itself, i.e. the pump may comprise a processing unit configured to apply the trained machine-learning model. For example, the pump may be installed pre-loaded with a basic machine-learning model that can identify the application type it is installed in, e.g. by collecting a set of data points and by identifying a matching cluster or by identifying a class according to a pre-trained classification model. The data used as inputs to the model may include time series data and/or summary statistics and/or static data. The processing unit may comprise a memory having stored thereon model parameters representing the trained machine-learning model. The processing unit may comprise memory having stored thereon computer-executable instructions for causing the processing unit to apply the trained machine-learning model to monitored operational variables. Accordingly, the pump may be configured to apply the trained machine-learning model and to control the operation of the pump as a stand-alone unit, i.e. without any need for communication with an external device such as with an external data processing system. The memory having stored therein the model parameters and the memory having stored thereon the computer-executable instructions may be the same memory or separate memories. The model parameters may be stored as a part of the computer-executable instructions or separate therefrom.

Alternatively or additionally, the pump may be connectable to a cloud-based system and/or to another type of local or remote data processing system that is configured to implement the machine-learning model, in particular to perform the classification or cluster identification. In some embodiments, the pump may be communicatively connectable to a smartphone, a tablet computer or to another portable data processing device, e.g. via Bluetooth or another suitable wireless or wired communications link, such as via a Wifi connection, via an Ethernet connection etc. This facilitates use of a larger and more detailed dataset and allows for more computational power to be used to arrive at a more precise classification. Furthermore, the user may use the data processing device or system to capture one or more images of the installation that includes the pump. The one or more images may then be included as additional input data in the classification of the system. To this end, a portable data processing device implementing the trained machine-learning model may include a camera for capturing one or more images of the pump when the pump is installed as a part of a system. Alternatively or additionally, one or more images may be taken by a separate camera and communicated to the data processing system implementing the trained machine-learning model.

Accordingly, in some embodiments, the trained machine-learning model may be implemented by a data processing system separate from the pump. In such embodiments, the pump may comprise a communications interface configured to communicate with the data processing system, in particular to send monitored operational variables to the data processing system and to receive an application type and/or a corresponding set of one or more application-specific control parameters from the data processing system. Similarly, the data processing system may comprise a communications interface configured to communicate with the pump, and a processing unit configured to apply the trained machine-learning model to the operational variables received from the pump. To this end, the processing unit may comprise a memory having stored thereon model parameters representing the trained machine-learning model. The processing unit may comprise memory having stored thereon computer-executable instructions for causing the processing unit to apply the trained machine-learning model to monitored operational variables. The memory having stored therein the model parameters and the memory having stored thereon the computer-executable instructions may be the same memory or separate memories. The model parameters may be stored as a part of the computer-executable instructions or separate therefrom. The data processing system may the send the determined application type to the pump. Alternatively or additionally, the data processing system may determine a suitable set of one or more application-specific control parameters matching the determined application type and send the determined set of one or more application-specific control parameters to the pump. Optionally, the data processing system In embodiments, where the data processing system only sends a determined application type to the pump, the pump may be configured to select a suitable set of one or more application-specific control parameters matching the received application type. In any event, the pump may be configured to apply a set of one or more application-specific control parameters determined based on a determination, by an external data processing system, of an application type in which the pump operates. Accordingly, the identification of the application type may be based on complex machine-learning models that are not limited by the normally limited computational resources of the pump. Examples of a data processing system include a suitably programmed computer, a virtual machine, a distributed data processing system, a tablet computer, a smart phone, etc. In some embodiments, the data processing system includes a portable data processing device such as a smart phone or tablet computer. The portable data processing device may communicate with the pump via a wired or short-range wireless communications link. The trained machine-learning model may be implemented by the portable data processing device itself. Alternatively, the portable data processing device may communicate with a remote data processing system, e.g. a server computer. This communication may e.g. be performed via a cellular telecommunications network, via the internet and/or the like. The remote data processing system may implement the trained machine learning model and/or perform the training of a refined machine-learning model, e.g. based on data received from the pump via the portable data processing device.

Generally, communication between the pump and a data processing system may be established through a wired connection such as via Ethernet, USB, etc. Alternatively, the communication may be established via a wireless connection using one or more suitable wireless technologies such as WIFI, Bluetooth or the like. The communication may be a direct connection between the pump and the data processing system or an indirect communication via a suitable gateway, a computer network, or the like.

Some embodiments of the method described herein may include a first trained machine-learning model implemented locally by a processing unit of the pump and a second trained machine-learning model implemented by an external data processing system. Accordingly, the method may comprise:

determining whether the pump is communicatively coupled to an external data processing system configured to implement the second trained machine-learning model;

responsive to determining that the pump is communicatively coupled to the external data processing system, communicating the monitored one or more operational variables to the external data processing system; applying the second trained machine-learning model, by the external data processing system, to the communicated monitored one or more operational variables so as to determine an application type; and communicating the application type and/or a set of one or more application-specific control parameters matching the application type to the pump;

responsive to determining that the pump is not communicatively coupled to the external data processing system, applying the first trained machine learning model by the pump to the monitored one or more operational variables so as to determine an application type.

Accordingly, the pump may be controlled based on a determined application type regardless of whether the pump is communicatively coupled to an external data processing system. Moreover, the process may apply the best available machine-learning. In particular, compared to the first trained machine-learning model, the second trained machine-learning model may be:

more complex, trained based on a larger set of training data, trained based on a set of training data that includes monitored operational variables from different pumps and/or different systems, trained based on training data that includes more recently monitored operational variables, a combination of one or more of the above.

The determination of the application type may be based entirely on a local machine-learning model implemented by the pump or it may be based on a local machine-learning model only when the pump is currently not communicatively connected to an external data processing system. In both embodiments, the training process for creating the local machine-learning model may be performed by an external data processing system.

To this end, a pump that is communicatively connected to an external data processing system may communicate the data acquired by the pump, in particular operational variables monitored by the pump, to the external data processing system. The data may then be stored by the external data processing system for use as training data during the training of a refined machine-learning model, thereby continuously improving the trained machine-learning model. If a pump is not communicatively connectable to an external data processing system, the pump may store the acquired data locally in a memory of the pump, either in full or in condensed form. The locally stored data may subsequently be retrieved, e.g. when servicing the pump by a service person. The data can be downloaded from, e.g. via a wired connection, via a short-ranged wireless communications interface, using a portable data storage device, and/or the like. The retrieved data may then be loaded onto an external data processing system and used for improving the pre-loaded machine-learning model to be used for this or other pumps. The thus created improved machine-learning model may be transferred to the pump in a similar manner, i.e. using a wired or a short-range wireless connection or a portable data carrier or in another suitable manner.

While local training of a machine-learning model using a processing unit is possible, training of the machine-learning model completely or in part by an external data processing system is normally more efficient, because the training typically requires considerable computational resources. The training may be based on monitored data from one or multiple pumps operating in different systems and for performing different types of operations. The training may result in a trained machine-learning model, in particular in a set of model parameters of such a model, that may then be stored in a memory of a pump, e.g. during manufacturing of the pump. It will be appreciated that the model parameters may also be communicated to a pump that is already installed in a system. This may be particularly useful in order to provide updated machine-learning models.

In some embodiments, the pump may be provided with an initial machine-learning model, e.g. during manufacturing. The initial machine-learning model may subsequently be updated, e.g. adapted to the specific pump. To this end, the initial machine-learning model may be updated based on a supplementary set of training data obtained by the specific pump, e.g. during an initial calibration phase. Alternatively or additionally, the initial machine-learning model may subsequently be updated based on monitored operational variables, obtained by the specific pump and/or by other pumps operating in different systems.

Embodiments of the process described herein may be performed upon initial start-up of the pump. In some embodiments, the process may be performed only upon initial start-up of the pump. Alternatively or additionally, the process may be performed when triggered by a user input and/or by another trigger condition, e.g. upon each start-up of the pump, upon elapse of a predetermined period of time, upon elapse of a predetermined operational time, after a predetermined number of start-ups, or combinations thereof.

As mentioned above, in some embodiments, the pump may be communicatively connectable to an external data processing system, in particular to a portable data processing device such as a tablet or a smartphone. The machine-learning model may then be implemented by the portable data processing device or by the pump. In both cases, the portable data processing device may provide a user-interface, e.g. controlled by an app or other computer program executed by the portable data processing device. The user interface may allow a user to view results of the setting of application-specific control parameters based on an identification of the application type. For example, the user-interface may display the identified application type and/or it may display a control mode and/or other set of application-specific control parameters selected by the pump or by the portable data processing device based on the identified application type. In some embodiments, the user interface may allow the user to control aspects of the process, e.g. by allowing the user to initiate the process, optionally including the entering of certain selectable parameters associated with the process, e.g. a minimum duration of the monitoring, information about the pump, etc. In some embodiments, the user-interface may display a proposed application-specific control mode and/or other set of application-specific control parameters resulting from the determination of the application type as described herein. The user-interface may then provide functionality allowing a user to approve the proposed application-specific control parameters and/or to provide feedback. For example, the user-interface may allow the user to enter alternative control parameter settings or manually select an alternative application type. This feedback may be stored and used together with the data acquired by the pump, in particular the monitored operational variables, as training data for subsequent improvement of the machine-learning model.

The trained machine-learning model may be implemented by a computer program when the computer program is executed by a processing unit, or it may be implemented by an otherwise suitably configured processing unit. In particular, a processing unit implementing the trained machine-learning model may receive a set of monitored operational variables, e.g. in the form of one or more time series of the respective operational variables. The processing unit implementing the trained machine-learning model may be adapted to map the received set of monitored operational variables to one of a set of clusters and/or to one of a plurality of predetermined application types.

The trained machine-learning model may include a neural network model. The neural network model may include a recurrent portion and/or one or more feed-forward portions. The feed-forward portion may include one or more convolutional network layers.

It is noted that features of the various embodiments of a computer-implemented method described above and in the following may be implemented at least in part in software or firmware and carried out on a data processing system or other processing unit caused by the execution of program code means such as computer-executable instructions. Here and in the following, the term processing unit comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof.

The present disclosure relates to different aspects, including the method described above and in the following, further methods, systems, devices and product means, each yielding one or more of the benefits and advantages described in connection with one or more of the other aspects, and each having one or more embodiments corresponding to the embodiments described in connection with one or more of the other aspects described herein and/or as disclosed in the appended claims.

In particular, another aspect disclosed herein relates to embodiments of a data processing system configured to perform the acts of the method described herein. To this end, the data processing system may have stored thereon program code configured, when executed by the data processing system, to cause the data processing system to perform the acts of the method described herein. In some embodiments, the data processing system may include a processing unit of a pump and/or one or more data processing apparatus external to the pump.

The processing unit of a pump may be integrated into a drive circuit of the pump, e.g. into a drive circuit controlling the pump motor. Accordingly, the drive circuit of the pump may be suitably programmed to perform an embodiment of the process described herein, either alone as a stand-alone device or as part of a distributed data processing system, e.g. in cooperation with an external data processing system such as with a portable data processing device and/or with a remote host computer and/or with a cloud-based architecture. The processing unit may include a memory for storing model parameters and/or for storing monitored operational variables.

According to yet another aspect, disclosed herein are embodiments of a control system for controlling a pump when the pump is operated a part of a system for moving a fluid, the control system comprising a data processing system configured to perform the acts of an embodiment of the method described herein. The control system may further comprise the pump.

Embodiments of the control system automatically identify which application the pump is installed in. This may lead to a faster commissioning and reduces the number of installation errors than may occur when the application type is manually entered by the user by service personnel.

The pump may comprise one or more fluid-moving components and a pump motor configured to drive the one or more fluid-moving components of the pump. The pump may further comprise a drive circuit controlling the pump motor. The data processing system may be a data processing system separate from the pump, in particular a data processing system communicatively coupled to the pump. Alternatively, a part of the data processing system or the whole data processing system may be integrated into the pump, e.g. accommodated in a housing of the pump. In particular, at least a part of the data processing system may be embodied as a processing unit of the pump, e.g. a processing unit integrated into the drive circuit of the pump or embodied as a separate processing unit.

Yet another aspect disclosed herein relates to embodiments of a computer program configured to cause a data processing system to perform the acts of the computer-implemented method described above and in the following. A computer program may comprise program code means adapted to cause a data processing system to perform the acts of the computer-implemented method disclosed above and in the following when the program code means are executed on the data processing system. The computer program may be stored on a computer-readable storage medium, in particular a non-transient storage medium, or embodied as a data signal. The non-transient storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

The above and other aspects will be apparent and elucidated from the embodiments described in the following with reference to the drawing in which.

DETAILED DESCRIPTION

Figure 1:
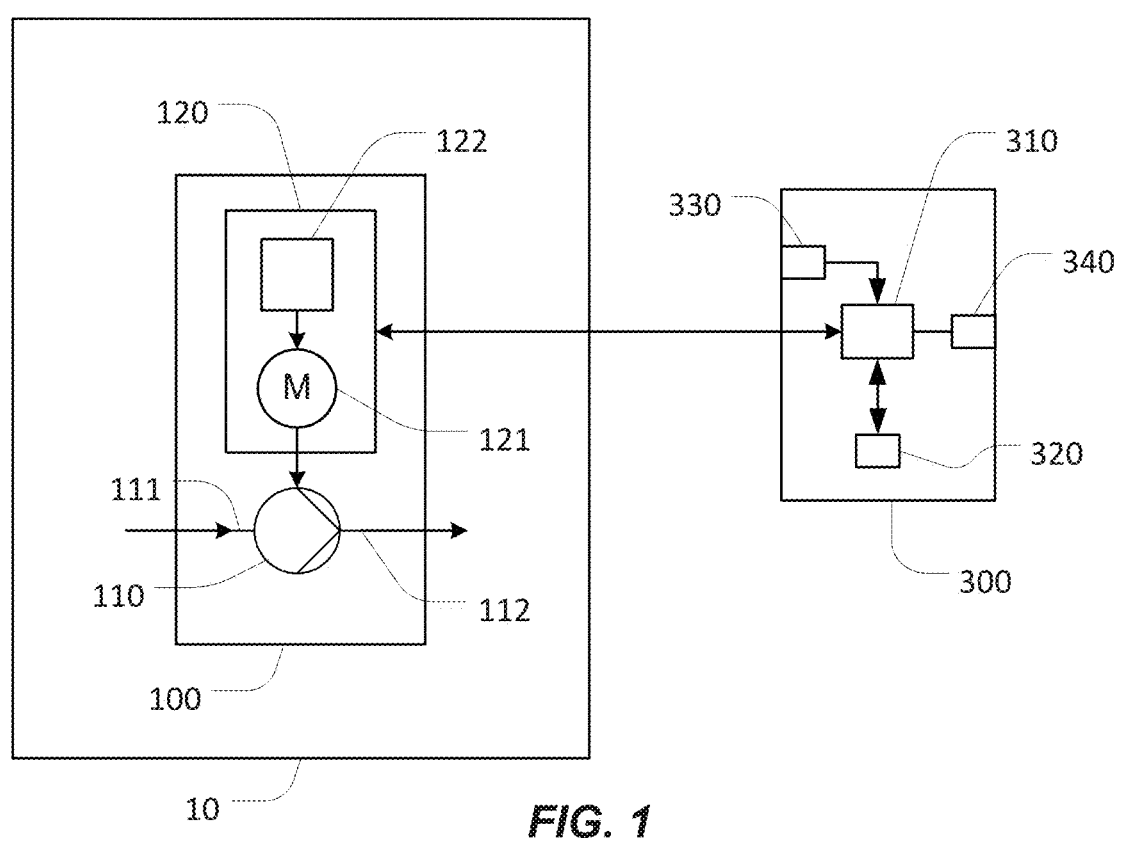
FIG. 1 schematically illustrates a system for moving a fluid.

FIG. 1 schematically illustrates an embodiment of a system for moving a fluid, such as a liquid, e.g. water. The system 10 comprises a pump 100. The system further comprises additional components (not explicitly shown) in addition to the pump 100, such as pipes, valves, fluid reservoirs, other pumps, sensors, boilers, etc. Some or all of the additional components are directly or indirectly operationally coupled to the pump e.g. in fluid communication with the pump.

The pump 100 comprises a fluid displacement mechanism 110 and a pump drive 120. The fluid displacement mechanism 110 may be a centrifugal pump or a different type of pump. The fluid displacement mechanism 110 has an inlet 111 for suction of water or a different fluid, such as of a different liquid. The fluid displacement mechanism 110 also has an outlet 112 for providing the output flow of the pump. The pump drive 120 comprises a motor 121, such as an electrical motor, and a motor drive circuit 122. The motor drive circuit may include a frequency converter for supplying the motor with electrical energy and/or other circuitry for controlling operation of the motor 121. The motor drive circuit may be connectable to a suitable power supply (not shown) in order to supply the drive circuit, e.g. a frequency converter, with electric energy. During operation, the motor 121 drives the pump causing the fluid displacement mechanism to pump fluid from the inlet 111 to the outlet 112 at a flow rate.

The system of FIG. 1 further comprises a data processing system 300, external to the pump. The external data processing system 300 may be a suitably programmed computer or other data processing device; alternatively the data processing system may be a distributed system including more than one computer. For example, the data processing system may be a suitably programmed tablet computer, smartphone or the like. Other examples of a data processing system may include a control system configured to control one or more pump assemblies. The data processing system is communicatively coupled to the pump 100, e.g. via a wired or wireless connection. In particular, the data processing system 300 may be communicatively coupled to the pump drive 120, such as to the motor drive circuit 122. The communication between the pump and the data processing system may be a direct communication link or an indirect link, e.g. via one or more nodes of a communications network. Examples of a wired connection include a local area network, a serial communications link, etc. Examples of wireless connections include a radio frequency communications link, e.g. Wifi, Bluetooth, cellular communication, etc.

The data processing system 300 comprises a suitably programmed processing unit 310 and a memory 320. The memory has stored thereon a computer program and/or data for use by the processing unit.

Optionally, the data processing system 300 further comprises an image capture device 330, such as a digital camera. For example, the image capture device 330 may be a built-in camera of a tablet computer or smartphone. Alternatively, the camera may be a separate device communicatively coupled to a computer. The image capture device may be a conventional digital camera or a device configured to capture IR images, a depth camera, or another device for obtaining 2D or 3D images of physical structures. It will be appreciated that some embodiments of a data processing system may not include any image capturing device.

Optionally, the data processing system 300 comprises a user-interface 340, e.g. including a graphical user-interface displayed on a display of the data processing system such as on a touch screen.

During operation, the data processing system 300 receives values of one or more operational variables from the pump 100. The received operational variables may e.g. include one or more operational variables of the pump motor and/or one or more operational variables indicative of a property of the fluid being pumped by the pump and/or one or more operational variables indicative of an operational state of another part of the system 10, different from the pump 100.

The data processing system 300 may receive the operational variables intermittently, e.g. periodically, e.g. such that the data processing system receives one or more time series of values indicative of the respective operational variables at different points in time. The pump may transmit the operational variables automatically or upon request from the data processing system. Each value of an operational variable may be associated with a time stamp. The data processing system 300 may receive static data from the pump e.g. indicative of a pump identifier, a pump type and/or the like.

The processing unit 310 applies a trained machine-learning model to automatically determine an application type from the monitored operational variables and, optionally, from additional input data such as from one or more images of the system captured by the image capture device 330. To this end, model parameters of the trained machine-learning model are stored in memory 320 of the data processing system. The processing unit 310 further determines a set of one or more application-specific control parameters associated with the determined application type. The data processing system 300 may output the determined application type and/or the determined application-specific control parameters via the user-interface 340. The data processing system may further receive a user-approval of the determined application type or application-specific control parameters and/or other user input via the user-interface 340. The data processing system sends the determined application-specific control parameters, optionally subject to user approval, to the pump drive 120 for subsequent control of the pump based on the determined application-specific control parameters.

An example of a process performed by the processing unit will be described in more detail below.

Figure 2:
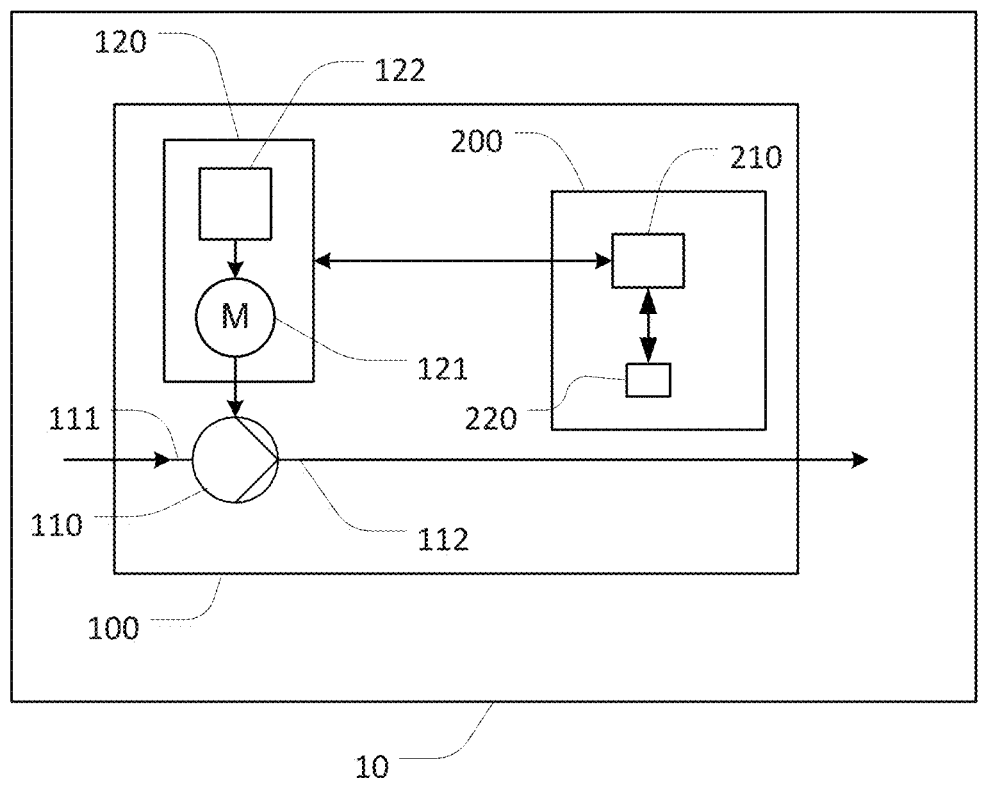
FIG. 2 schematically illustrates another embodiment of a system for moving a fluid.

FIG. 2 schematically illustrates a system 10 comprising a pump 100 that has a data processing system in the form of a data processing unit 200 integrated into the pump. The pump further includes a fluid displacement mechanism 110 and a pump drive 120 as described in connection with FIG. 1. The data processing unit 200 may be as described in connection with the data processing system 300 of FIG. 1 except that, in this embodiment, the data processing unit 200 is integrated into the pump 100, e.g. accommodated into the same housing as the pump drive 120. Accordingly, the data processing unit 200 receives the values of the one or more operational variables from the pump drive via an internal interface, e.g. a data bus or another suitable wired or wireless interface. Even though not explicitly shown in the embodiment of FIG. 2, it will be appreciated that the internal data processing unit may include a user-interface as described in connection with FIG. 1. The data processing unit 200 of the embodiment of FIG. 2 differs from the data processing system of FIG. 1 in that the data processing unit 200 of FIG. 2 does not include an image capture device. The internal data processing unit 200 of the pump may thus determine the application type it is operated in based on the received operational variables and, optionally, additional knowledge of the pump type or other sensor data.

Figure 3:
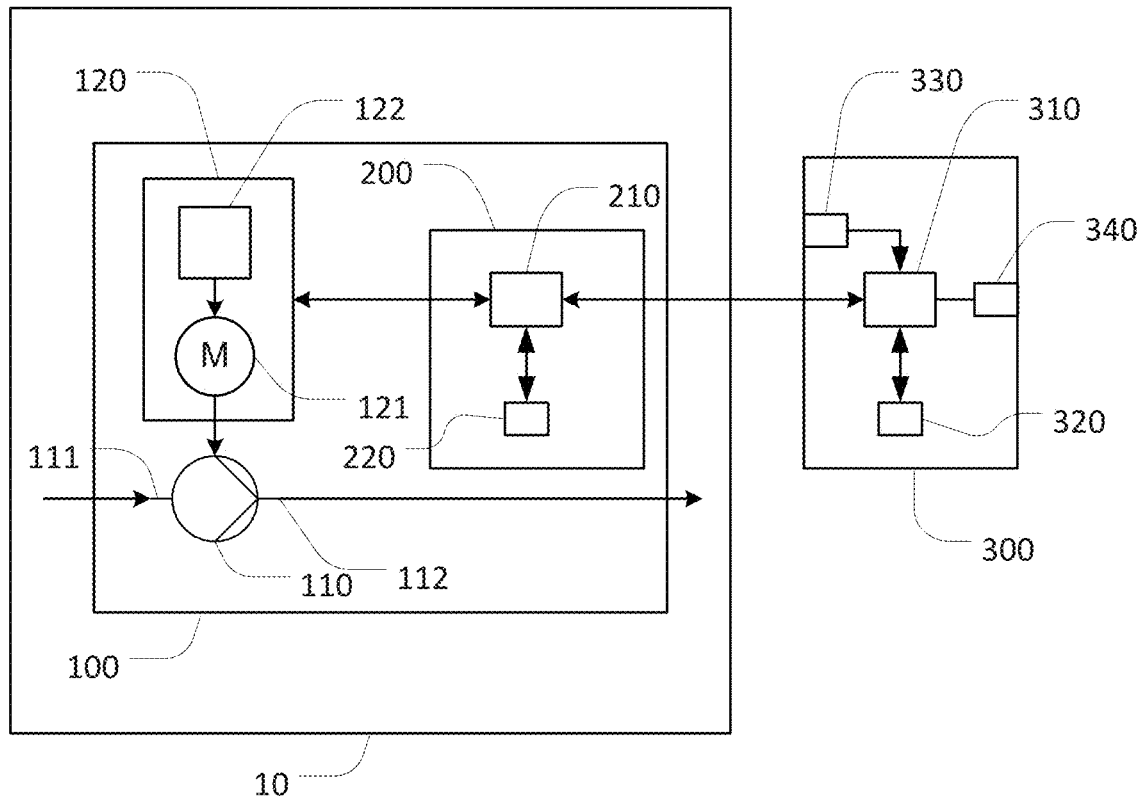
FIG. 3 schematically illustrates yet another embodiment of a system for moving a fluid.

FIG. 3 schematically illustrates a system 10 comprising a pump 100 that has a data processing system in the form of a data processing unit 200 integrated into the pump as described in connection with FIG. 2. The embodiment of FIG. 3 further includes an external data processing system 300. The external data processing system 300 includes a processing unit 310, a memory 220, an optional image capturing device 330 and a user interface 340, all as described in connection with the data processing system 300 of FIG. 1.

Accordingly, in the embodiment of FIG. 3, the pump may determine an application type and corresponding application-specific control parameters regardless of whether the pump is currently connected to the data processing system 300. If the pump is not currently connected to the data processing system 300, the pump may determine the application type and associated application-specific control parameters by means of its internal data processing unit 200. To this end, the pump may applying a pre-loaded machine-learning model stored in internal memory 220. If the pump is currently connected to the data processing system 300, the pump may send the monitored operational variables to the data processing system 300. The data processing system 300 may then determine the application type and associated application-specific control parameters, optionally based on additional input data, such as based on one or more images of the system 10 captured by the image capture device 330. The data processing system 300 may also implement are more complex and/or updated machine-learning model. The data processing system may then return the determined application type and/or associated application-specific control parameters to the pump for control of the pump drive 120.

Generally, in the above or other embodiments of a pump system, an embodiment of the process described herein may identify and/or classify the application in which the pump is installed. In some embodiments, the pump is pre-loaded with a basic trained machine-learning model, in particular a classification model, operable to identify the type of application the pump is installed in, e.g. by identifying a matching cluster of a plurality previously identified clusters. This is done by collecting a set of data points and identify a matching cluster according to the pre-trained classifier. The data being used may be time series data or summary statistics as well as static data.

Alternatively or additionally, the pump may be connected to a cloud or a local computing device where the cluster identification is made. This connection may be established through a wired connection such as ethernet or wireless technologies such as WIFI, Bluetooth or similar either via a suitable gateway or directly. In one embodiment, the pump may be operable to connect to a smartphone via Bluetooth. This allows for the use of a larger and more detailed dataset as well as more computational power to make a more precise classification. Furthermore, the user may take pictures of the installation and include these in the classification of the system.

In the following, embodiments of a process for controlling a pump based on a determined application type are described in more detail.

Figure 4:
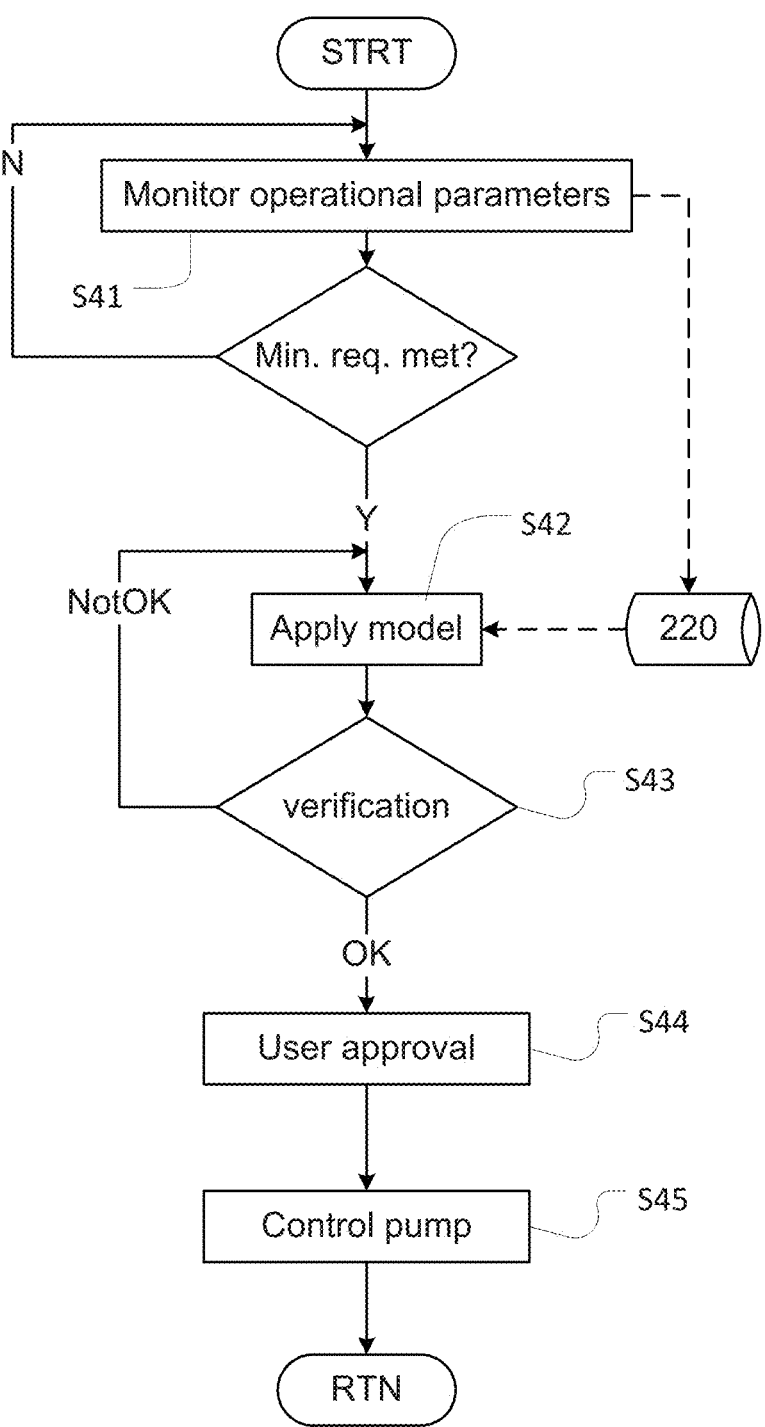
FIG. 4 schematically illustrates a process for controlling a pump.

FIG. 4 schematically illustrates a process for controlling a pump. The process may e.g. be performed by the data processing system 300 of FIG. 1 or 3, or by the data processing unit 200 of FIG. 2 or 3.

At step S41, the process monitors one or more operational variables of the pump, for example a frequency or rotational speed of the pump motor, a power, in particular an electrical power, of the pump motor, an electrical drive current fed into the pump motor, an energy consumption of the pump motor, a temperature of the motor electronics, a temperature of the pump motor, a temperature of the fluid, a flow rate indicative of a rate of flow through the pump, a pressure of the fluid being moved, e.g. a pressure upstream and/or downstream of the pump, etc. In some embodiments, the process receives additional input data, such as information about the pump type, a pump serial number, etc.

The process continues to monitor the one or more operational variables for a minimum period of time, e.g. for at least 6 h such as at least 12 h such as at least 24 h, or until another suitable condition is fulfilled that indicates that sufficient data has been collected and/or until receipt of a user input or the like. The process stores the monitored data in a data storage device 220, e.g. a memory of the data processing unit of the pump or of an external data processing system. When sufficient data has been collected, the process proceeds at step S42.

At step S42, the process applies a trained machine-learning model to automatically determine an application type from the monitored operational variables. To this end, the process may feed one or more time series of the one or more monitored operational variables into the trained machine-learning model. Alternatively or additionally, the process may feed pre-processed input data derived from the monitored operational variables into the trained machine-learning model, e.g. one or more features extracted from the monitored time series. The machine-learning model may be stored in the data storage device 220, e.g. in the form of a number of model parameters defining the trained machine-learning model.

The trained machine-learning model outputs an application type, e.g. by classifying the received input into one of a plurality of classes or clusters where each class or cluster corresponds to a respective application type. The application type represents a type of system the pump operates in and/or a type of operation performed by the pump when operating in said system. Each application type is associated with a respective set of one or more application-specific control parameters, optionally represented as respective application-specific control modes. For example, the trained machine-learning model may perform a cluster identification based on results of a clustering process that was based on appropriate training data. The cluster identification may thus provide a cluster ID and, optionally, an appropriate control mode for said cluster ID.

Figure 5:
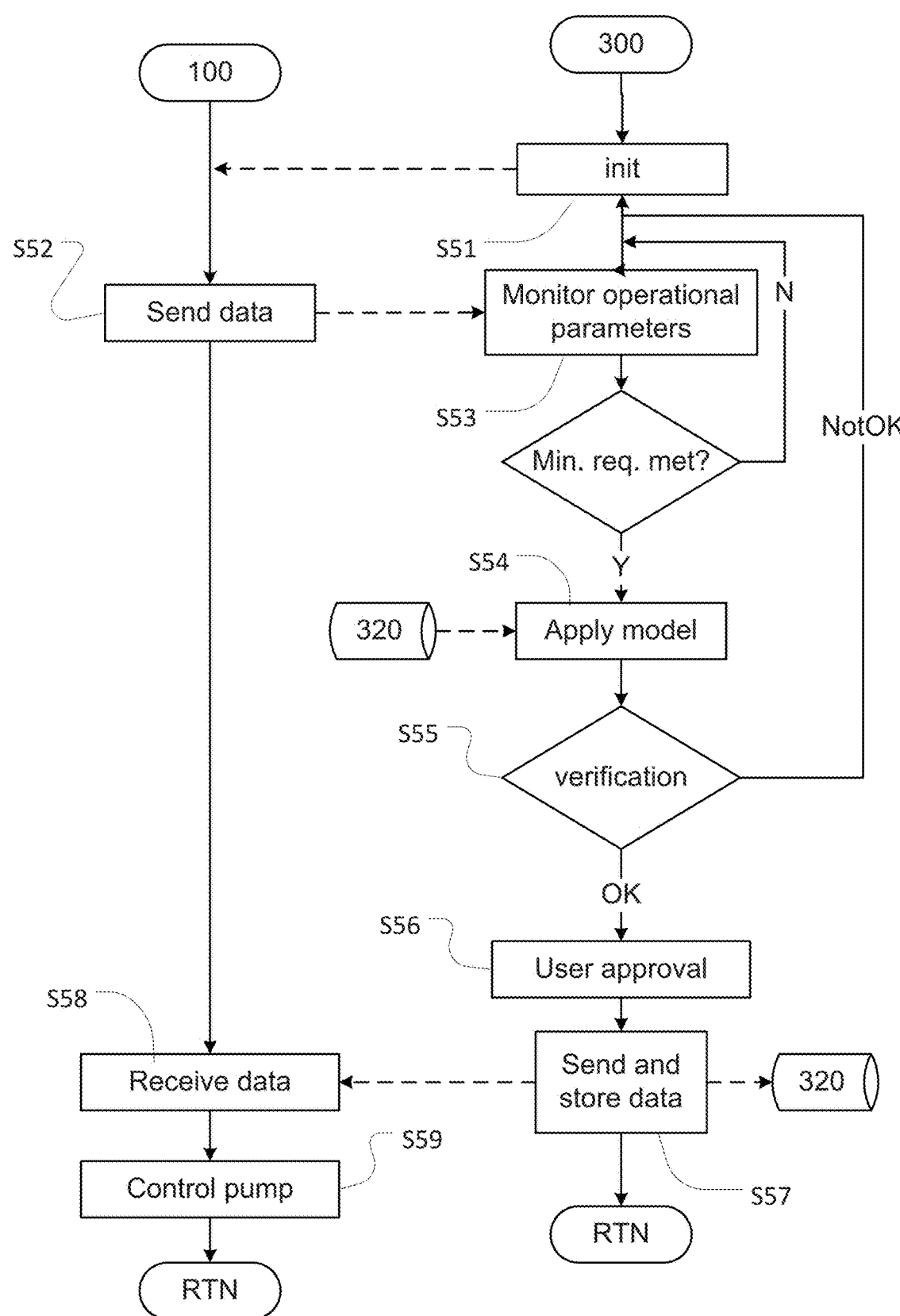
FIG. 5 schematically illustrates another embodiment of a process for controlling a pump.

FIG. 5 schematically illustrates another process for controlling a pump 100. The process may e.g. be performed by the system of FIG. 1 or FIG. 3. In particular, some steps of the process of FIG. 5 are performed by the pump 100 while other steps of the process are performed by a data processing system 300 external to the pump.

At step S51, the data processing system 300 initiates the process, e.g. by causing the pump to start acquiring operational variables or by requesting the pump to transmit monitored data, e.g. in real time or by transmitting logged data.

At step S52, the pump sends operational variables to the data processing system and the data processing system monitors the operational variables (step S53), e.g. as described in connection with step S41 of the process of FIG. 4.

The data processing system 300 continues monitoring the one or more operational variables for a minimum period of time, e.g. for at least 6 h such as at least 12 h such as at least 24 h, or until another suitable condition is fulfilled that indicates that sufficient data has been collected and/or until receipt of a user input or the like. The process stores the monitored data in a data storage device 320, e.g. a memory of the data processing system 300. When sufficient data has been collected, the process proceeds at step S54.

At step S54, the data processing system 300 applies a trained machine-learning model to automatically determine an application type from the monitored operational variables, e.g. as described in connection with step S42 of the process of FIG. 4. In the embodiment of FIG. 4, the trained machine-learning model is stored in data storage device 320 of the data processing system 300.

At step S55, the process performs a verification of the application type determined by the trained machine-learning model, e.g. as described in connection with step S43 of the process of FIG. 4. If the verification fails, the process may continue to monitor operational variables and re-apply the trained machine-learning model to an extended set of input parameters, in particular an extended set of monitored values of the operational variables.

If the verification step succeeds, the process proceeds at step S56 and displays the application type or the associated application-specific control parameters matching the determined application type to the user. The user may then approve or disapprove the determined application-specific control parameters. If the user disapproves, the user may manually adjust the application-specific control parameters, e.g. by selecting a different control mode or by manually selecting a different application type. In some embodiments, the user may even cause the process to return to step S53 so as to collect additional data and then to re-apply the trained machine-learning model to an extended data set. Upon user-approval, either based on the application-specific control parameters automatically determined by the system or based on user-adjusted application-specific control parameters, the process proceeds at step S57.

At step S57, the data processing system 300 stores the resulting application type and application-specific control parameters, e.g. the user-approved or user-selected application type and/or application-specific control parameters. In particular, the data processing system may store the application type and/or application-specific control parameters in association with the monitored data for use as training data when creating an improved machine-learning model. The data processing system further sends the application-specific control parameters and/or the application type to the pump 100. Upon receipt of the application-specific control parameters and/or application type (step S58), the pump 100 controls operation of the pump based on the thus received application-specific control parameters (step S59).

It will again be appreciated that alternative embodiments of the process may control the pump automatically, without initial user approval. Similarly, some embodiments may skip the verification step or even the verification step and the user approval step.

Figure 6:
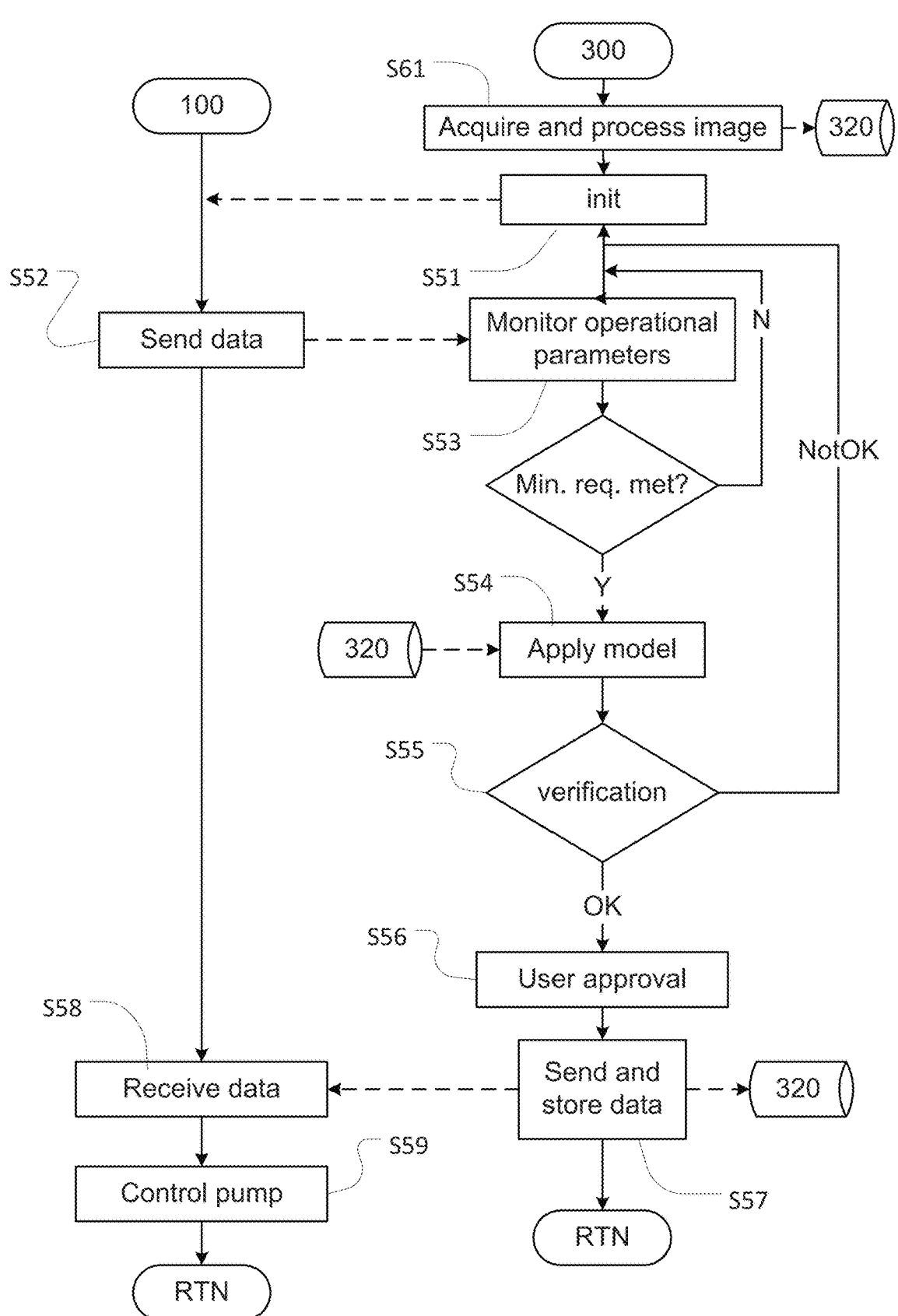
FIG. 6 schematically illustrates yet another embodiment of a process for controlling a pump.

FIG. 6 schematically illustrates another process for controlling a pump 100. The process may e.g. be performed by the system of FIG. 1 or FIG. 3. In particular, some steps of the process of FIG. 5 are performed by the pump 100 while other steps of the process are performed by a data processing system 300 external to the pump. The process of FIG. 6 corresponds to the process of FIG. 5, except that the process of FIG. 6 includes an initial step S61 of capturing an image of at least a part of the system in which the pump 100 is installed. The image may be an image of the pump and of the piping connecting the pump 100 with one or more other components of the system in which the pump is installed. For example, the image may be captured by a built-in camera of the data processing system 300 or by an external camera that is communicatively connectable to the data processing system. The image may be taken prior to initiating the monitoring of step S53, during the monitoring or after the monitoring. In some embodiments, the process acquires multiple images or even a video stream. The process stores the captured image(s) and uses it/them in step S54 as additional input data to the machine-learning model, optionally after suitable pre-processing of the captured image(s)—Examples of suitable pre-processing include an object-recognition process for recognising the pump and/or additional system components from the captured image(s). Other examples include feature detection processes, e.g. for detecting a pipe layout and/or the like.

Figure 7:
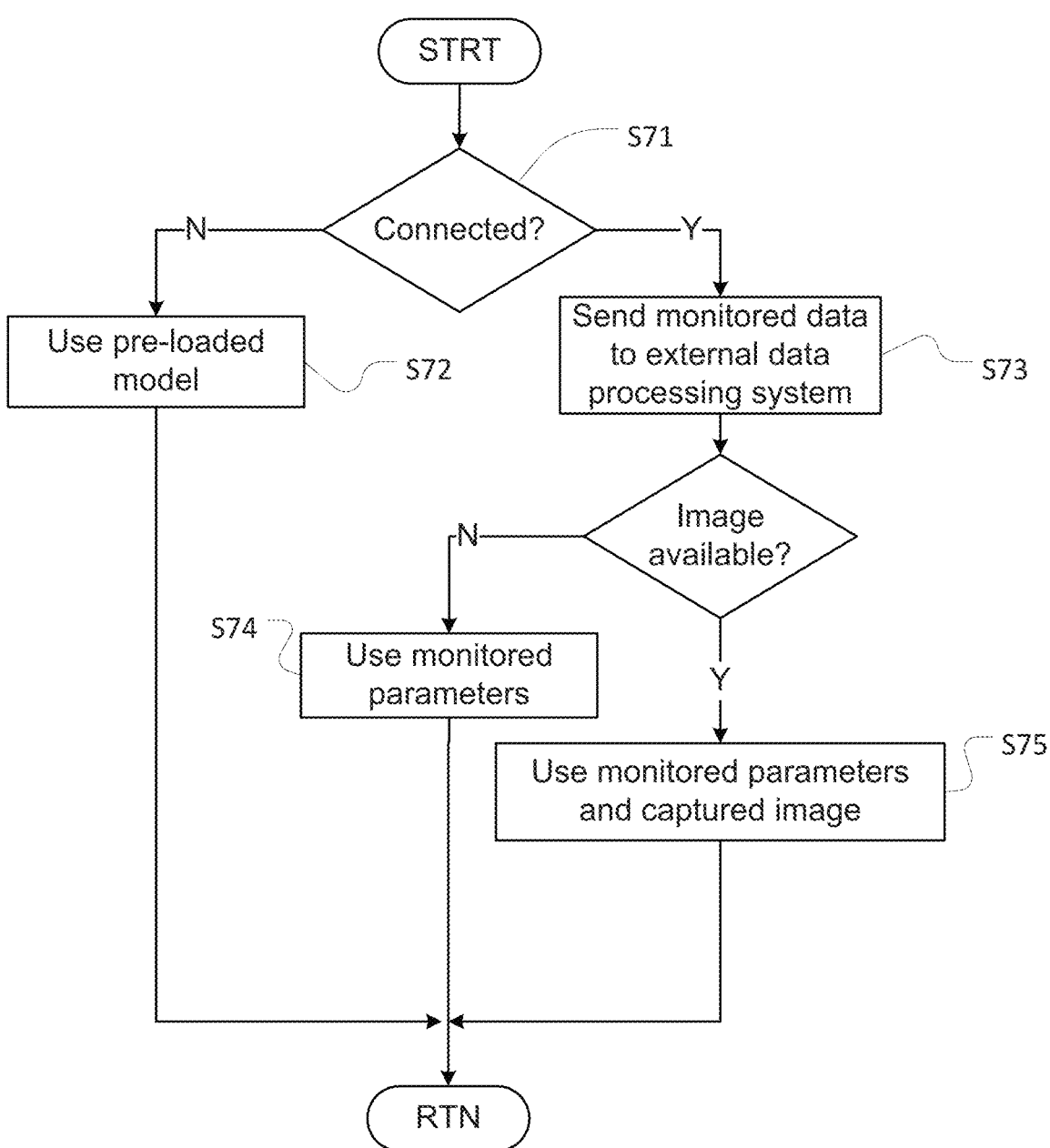
FIG. 7 schematically illustrates yet another embodiment of a process for controlling a pump.

FIG. 7 schematically illustrates another process for controlling a pump. The process may e.g. be performed by the system of FIG. 3. In initial step S71, the process determines whether to perform the determination of the application type in a connected mode or in a stand-alone mode. For example, to this end the pump may send a request via a suitable communications interface, requesting a determination of the application type. If the pump receives an acknowledgement, the pump determines that it is connected and operates in connected mode. If the pump does not receive any acknowledgement within a certain time period, the pump determines that it is not connected and operates in a stand-alone mode. Alternatively, the process may be triggered by receiving a command for determining the application type. If the command is received from a user-interface of the pump, the pump operates in a stand-alone mode. If the command is received via a communications interface from an external data processing system, the pump operates in a connected mode. In any event, if the pump operates in a stand-alone mode, the process proceeds at step S72; otherwise the process proceeds at step S73.

At step S72, i.e. when the pump operates in a stand-alone mode, the pump determines the application type using a pre-loaded machine-learning model stored locally in the pump. For example, an internal processing unit of the pump may perform the process of FIG. 4. The pump then controls the pump based on application-specific control parameters associated with the determined application type.

Alternatively, at step S73, i.e. when the pump operates in connected mode, the pump sends operational data to an external data processing system and the external data processing system uses a machine-learning model stored externally to the pump for determining the application type. Accordingly, the process may perform the steps of the process of FIG. 5 or FIG. 6. In particular, the data processing system may determine whether it has received a captured image of the system in which the pump operates. For example, the data processing system may request a user input as to whether the user wishes to proceed by capturing an image or not. If the user does not want to capture any image, the process proceeds at step S74; otherwise, the process proceeds at step S75.

At step S74, the process uses a machine-learning model and a data processing system external to the pump to determine the application type from monitored operational variables collected by the pump, e.g. by performing the steps of the process of FIG. 5. The process then controls the pump based on application-specific control parameters associated with the determined application type.

At step S75, the process uses a machine-learning model and a data processing system external to the pump to determine the application type from monitored operational variables collected by the pump and from one or more captured images, e.g. by performing the steps of the process of FIG. 6. The process then controls the pump based on application-specific control parameters associated with the determined application type.

Generally, in various embodiments of the method and system described herein, the machine-learning model is trained, in particular trained based on a set of training data. Training data may be obtained at least in part from pumps installed in respective systems, e.g. collected while performing their normal operations. For connected pumps the retrieved data may be stored in the cloud or in a locally connected data processing device for use in future cluster identifications, thereby continuously improving the training data that is used for cluster identification. For pumps not connected, the retrieved data may be stored locally in the pump, either as a full data set or in condensed form. If the pump is subsequently serviced by a service person or connected to a data processing system, the data can be downloaded from the pump and taken back for improving the data set used for the pre-loaded classification on the same and/or other pumps.

Figure 8:
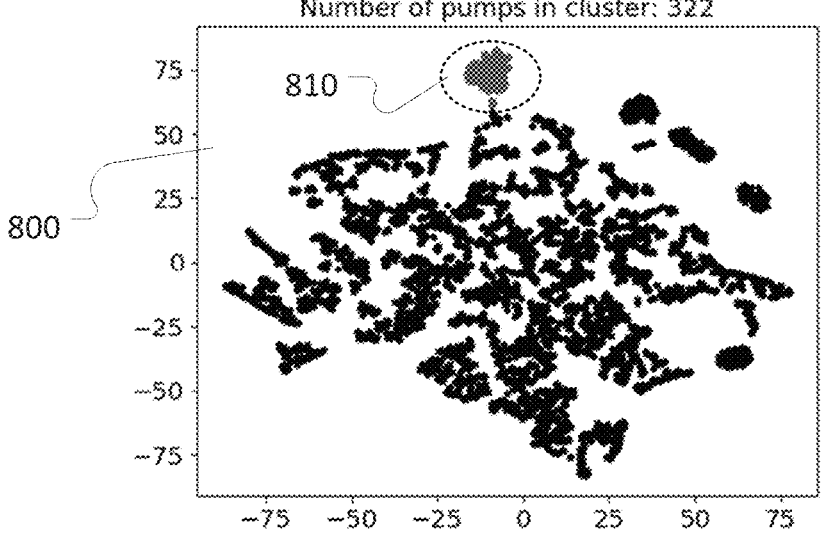
FIGS. 8-10 schematically illustrate a trained machine-learning model.
Figure 8:
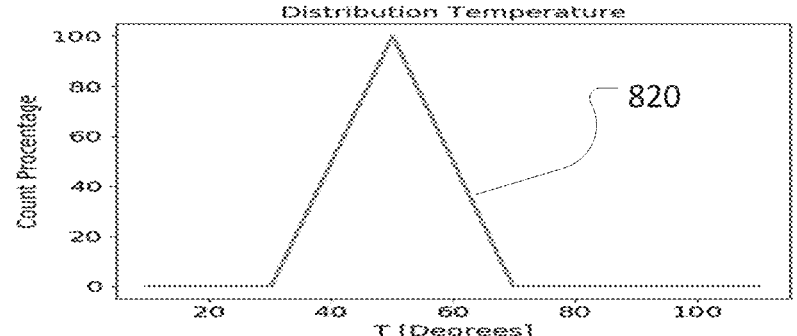
Figure 8:
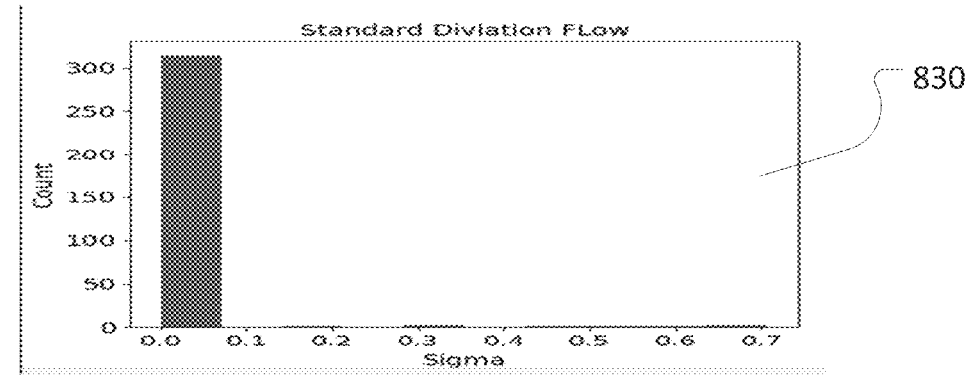
Figure 8:
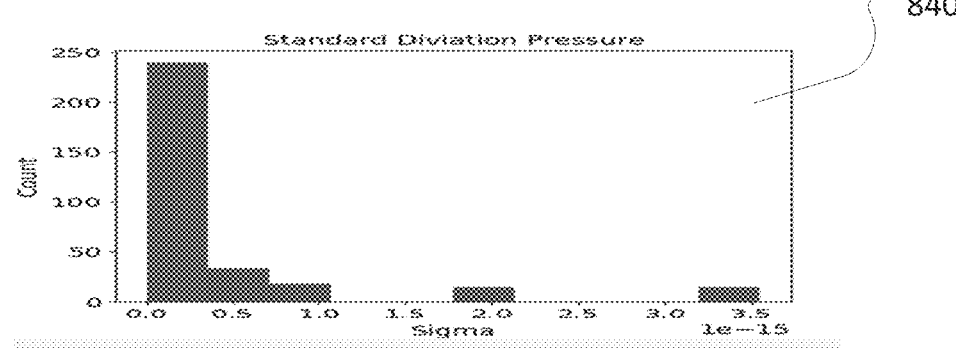
Figure 9:
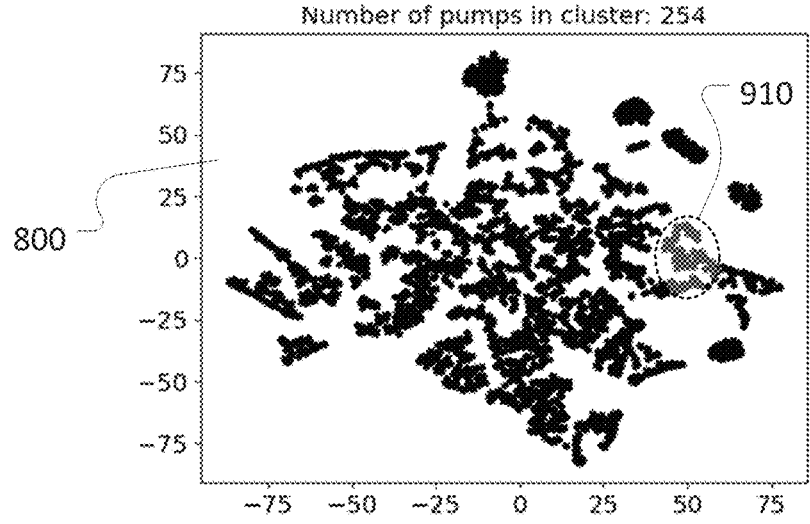
Figure 9:
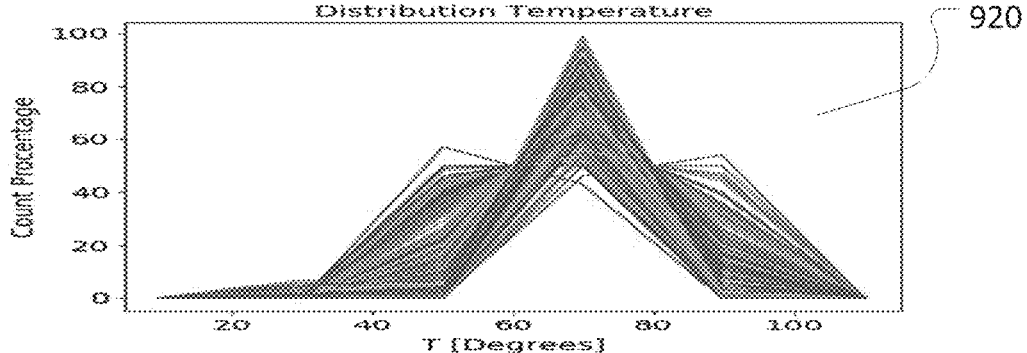
Figure 9:
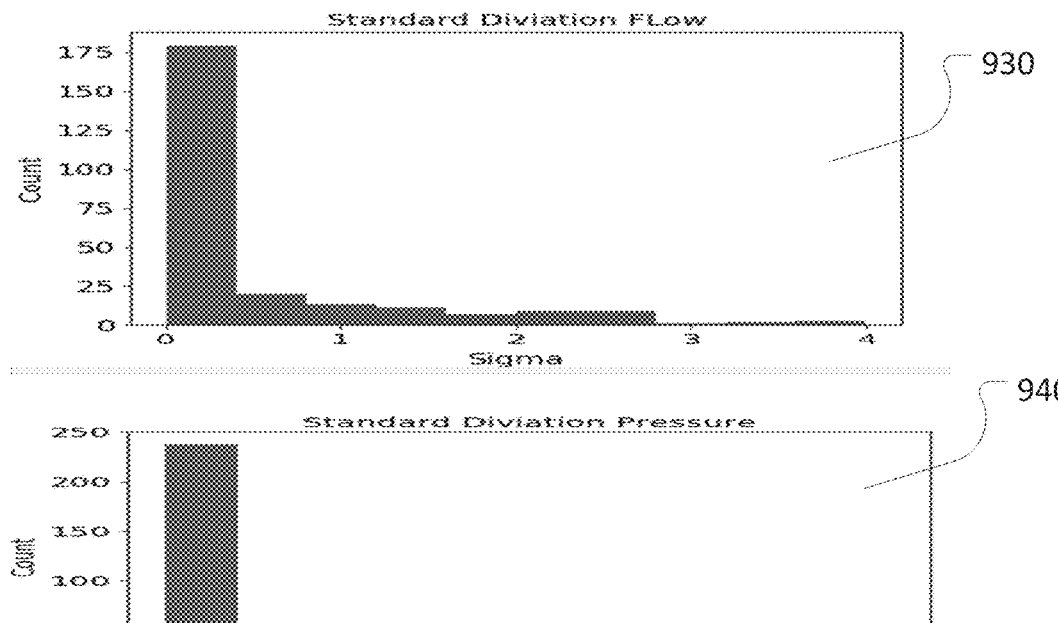
Figure 10:
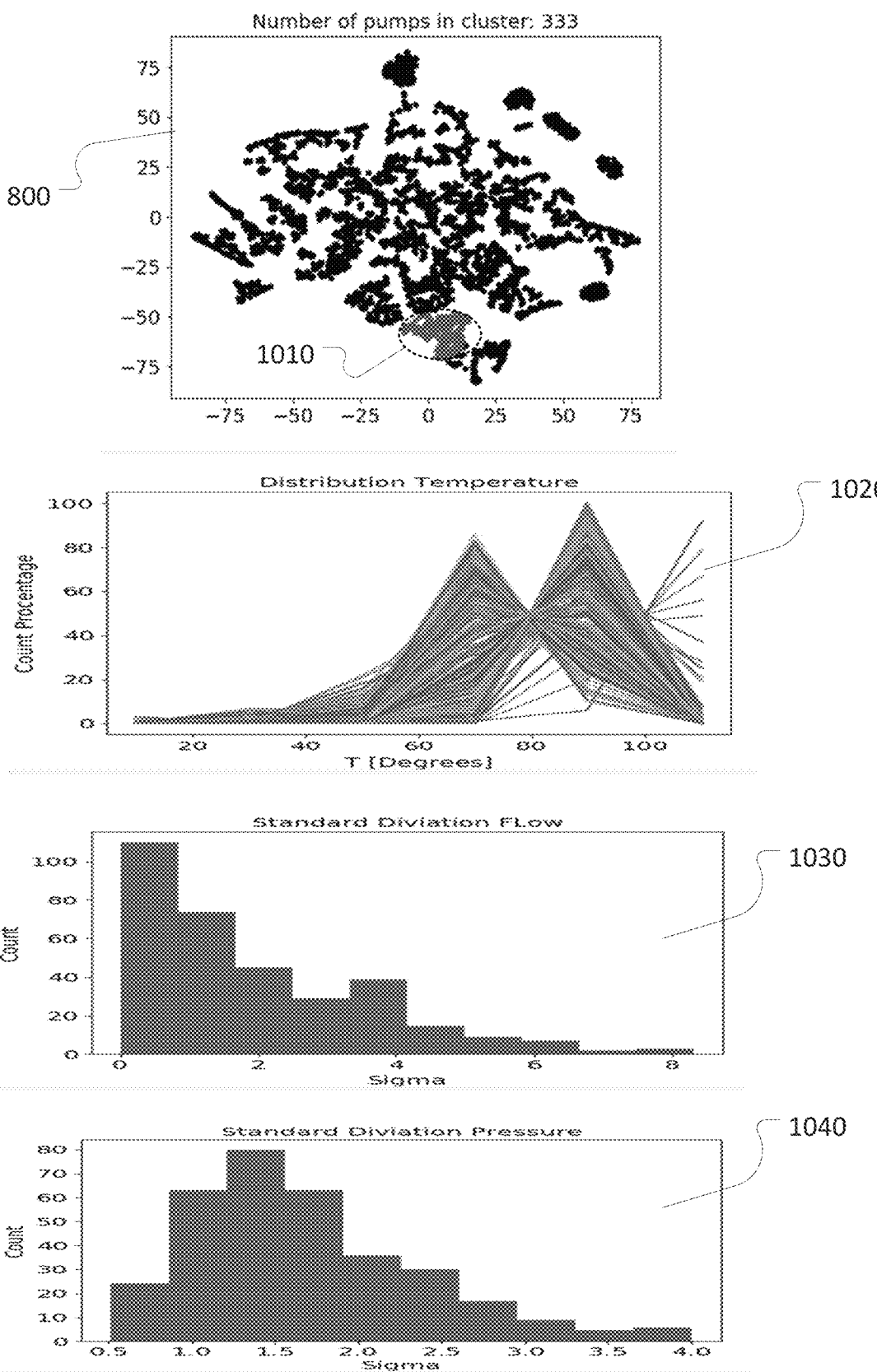

FIGS. 8-10 illustrate an example of a trained machine-learning model, in particular a clustering model.

The clustering model is trained based on a representative training set of data from applications, wherein the different clusters can be separated in the high-dimensional space of observations. The underlying meaning of the clusters is not necessarily known, but the clusters have similar characteristics, e.g. as illustrated in FIGS. 8-10. Examples of clusters may be associated with e.g. respective applications. Examples of such applications may include, but are not limited to, "hot water", "boiler pump", "fan coil unit", "Radiator system one pipe/Two pipe", "underfloor heating", Air handling unit", "Cooling". It is the machine-learning model that clusters the applications based on the monitored data. It is then then possible to manually label the clusters afterwards, i.e. to assign application types to them. The labels above are merely examples. It will be understood that the clustering results might not be as a priori expected. For example, two applications that may be considered by a technician as very different applications, might be combined by the clustering process into a single cluster. Similarly, two applications that may be considered by a technician as very similar, might be distinguished by the clustering process into two different clusters.

As new pump applications appear, the clustering algorithm may have to be re-trained with training data including data from such new applications. A new application might end up as a separate cluster, e.g. initially without label, or classified into the same cluster as previous applications.

The clustering analysis may be made using supervised learning techniques where the applications associated with each set of training data are a prior known. Alternatively, the clustering analysis may be made using unsupervised learning, where the applications are not a priori known. Suitable techniques include, but are not limited to; k-means clustering, auto encoders, T/SNE, PCA, support vector machines (SVA), decision trees and neural networks.

The machine-learning model is trained by a plurality of training data sets, each comprising a set of operational variables monitored by a pump while operating in a respective application.

The input data points to the model may include, but are not limited to; product number, product type, energy consumption, temperature, pressure, flow (measured or estimated) installation size (counting number of nearby pumps), GPS data such as postal code and country, control mode, (constant pressure, proportional), set point, flow limit, electronics temperature and weather data. Furthermore, the model may receive sensor data from the rest of the system such as; pressure, temperature, flow, valve positions.

In one embodiment, the following operational variables are used as input data points: product identifier (e.g. product number and/or product type), power consumption, control mode identifier, flow (estimated or measured) and rpm. A model using at least these operational variables as input has been found to provide sufficient accuracy of the classifier. In most applications, data from at least 24 hours of operation is collected, thereby covering a pattern of daily consumption cycles. A first classification on time series may thus be made after 24 hours. The classification may subsequently be updated as more data becomes available.

In the example of FIGS. 8-10, the operational variables included the temperature of the fluid being pumped, the flow rate through the pump and the pressure of the fluid being pumped. The model was trained using a clustering algorithm to determine how the training data can be grouped into a plurality of clusters. To this end, a cluster may be represented as a group of training data sets that all lie within a proximity of each other when represented in a suitable multi-dimensional space. FIG. 8 illustrates a two-dimensional representation of a space in which a training data set is represented. In this space, the operational data associated with each pump operating in respective application types is represented as a point in the two-dimensional space 800. A clustering algorithm has been used to determine a plurality of clusters, and FIG. 8 illustrates one of the identified clusters 810.

FIG. 8 further illustrates the distribution 820 of the monitored temperatures by the pumps associated with cluster 810, the distribution 830 of the standard deviation of the flow monitored by the pumps of cluster 810, and the distribution 840 of the standard deviation of the pressure monitored by the pumps of cluster 810.

FIG. 9 illustrates corresponding data for another cluster 910 of the same set of clusters as in FIG. 8, i.e. in the same space 800 as for FIG. 8. In particular, FIG. 9 illustrates the distribution 920 of the monitored temperatures by the pumps associated with cluster 910, the distribution 930 of the standard deviation of the flow monitored by the pumps of cluster 910, and the distribution 940 of the standard deviation of the pressure monitored by the pumps of cluster 910.

Finally, FIG. 10 illustrates corresponding data for another cluster 1010 of the same set of clusters, i.e. in the same space 800 as for FIG. 8. In particular, FIG. 10 illustrates the distribution 1020 of the monitored temperatures by the pumps associated with cluster 1010, the distribution 1030 of the standard deviation of the flow monitored by the pumps of cluster 1010, and the distribution 1040 of the standard deviation of the pressure monitored by the pumps of cluster 1010.

A comparison of the respective distributions within the clusters 810, 910, and 1010, respectively, illustrates that the operational data for pumps operating in different application types vary considerably from each other. Accordingly, when monitoring operational variables of a pump operating in a yet unknown application type, the operational variables may be mapped into the space 800 that had been determined by the clustering algorithm based on the training data. Moreover, the process may determine which of the determined clusters the newly obtained operational data is closest to within the space 800. The unknown application type may thus be determined as the application type of the pumps of the training set that correspond to the closest cluster.

Embodiments of the method described herein can be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

What is claimed is:

1. A computer-implemented method for determining one or more application-specific control parameters of a pump operating in a system for moving a fluid, the method comprising the steps of:

causing the pump to operate according to a first set of control parameters;

monitoring one or more operational variables of the pump during operation of the pump;

applying a trained machine-learning model to automatically determine from the monitored operational variables an application type of a system the pump operates in or is a part of, the application type being among a plurality of application types and representing a type of system the pump operates in and/or representing a type of operation performed by the pump when operating in said system, each application type of the plurality of application types being associated with a respective set of one or more application-specific control parameters, the system involving moving a fluid using the pump;

determining the set of one or more application-specific control parameters associated with a determined application type among the plurality of application types, at least one control parameter of the one or more application-specific control parameters being different from at least one control parameter of the first set of control parameters, receiving a user input indicative of an approval of the determined control parameters and/or the determined application type; and responsive to the user input indicating approval of the determined control parameters and/or the determined application type, controlling the pump based on the determined set of one or more application-specific control parameters associated with the determined application type such that further operation of the pump no longer operates according to the at least one control parameter of the first set of control parameters.

2. A computer-implemented method according to claim 1, wherein the machine-learning model is trained to map one or more monitored operational variables to a corresponding one of a plurality of classes, each class of the plurality of classes being associated with a respective application type.

3. A computer-implemented method according to claim 1, wherein monitoring comprises obtaining a time series of values of the one or more operational variables at respective points in time.

4. A computer-implemented method according to claim 1, wherein monitoring comprises monitoring over at least a predetermined period of time of at least one hour.

5. A computer-implemented method according to claim 1, wherein the monitored operational variables include at least one operational variable indicative of an operational state of a pump motor of the pump and/or at least one operational variable indicative of a property of the fluid being moved.

6. A computer-implemented method according to claim 5, wherein the monitored operational variable indicative of an operational state of a pump motor is chosen from a frequency or rotational speed of the pump motor, an operating power of the pump motor, an energy consumption of the pump motor, an electrical drive current fed into the pump motor, an operating temperature of a component of the pump motor; and/or wherein the monitored operational variable indicative of a property of the fluid being moved is chosen from: a temperature of the fluid being moved, a flow rate indicative of a rate of flow through the pump, a pressure of the fluid being moved.

7. A computer-implemented method according to claim 1, comprising receiving additional input data indicative of a property of the pump and/or of the system for moving the fluid, and wherein applying the trained machine-learning model comprises applying the trained machine-learning model to automatically determine an application type from the monitored operational variables and from the received additional input data.

8. A computer-implemented method according to claim 7, wherein the additional input data includes information about the pump, chosen from: a pump serial number or other pump identifier, a pump type, current control settings of the pump; and/or wherein the additional input data includes information about the system for moving fluid and/or about an environment of the pump, in particular information chosen from: an installation size indicative of a size of the system for moving fluid, sensor data indicative of operational state of one or more components of the system different from the pump, positional data indicative of a geographic position of the pump, weather data.

9. A computer-implemented method according to claim 7, wherein the additional input data includes one or more captured images of the pump and of at least a part of the system for moving fluid and wherein the process comprises performing an image processing step to extract one or more features from the one or more captured images and wherein applying the trained machine-learning model comprises applying the trained machine-learning model to automatically determine an application type from the monitored operational variables and from the extracted one or more features.

10. A computer-implemented method according to claim 1, wherein the monitoring comprises monitoring the one or more operational variables over an initial period of time resulting in an initial set of monitored operational variables, wherein the applying the trained machine-learning model comprises applying the trained machine-learning model to automatically determine an initial application type from the initial set of monitored operational variables, wherein the controlling the pump comprises controlling the pump based on a set of one or more application-specific control parameters associated with the determined initial application type, and wherein the method further comprises the steps of:

monitoring the one or more operational variables of the pump during operation of the pump in said system for an extended period of time longer than the initial period of time, resulting in an extended set of monitored operational variables;

applying the trained machine-learning model to automatically determine a revised application type from the extended set of monitored operational variables, controlling the pump based on a set of one or more application-specific control parameters associated with the determined revised application type.

11. A computer-implemented method according to claim 1, wherein the monitoring comprises causing the pump to operate in two or more modes of operation during the monitoring.

12. A computer-implemented method according to claim 1, wherein the trained machine-learning model is trained by a supervised learning algorithm or by an unsupervised learning algorithm, and wherein the training is based on training data including monitored operational variables from one or more pumps operated in respective types of applications.

13. A computer-implemented method according to claim 1, comprising verification of the determined application type by a rule-based automatic verification step and/or by receiving a user input indicative of an approval of the determined application type.

14. A computer-implemented method according to claim 1, wherein the pump comprises a processing unit configured to implement a first trained machine-learning model; and wherein the method comprises the steps of:

determining whether the pump is communicatively coupled to an external data processing system configured to implement a second trained machine-learning model;

responsive to determining that the pump is communicatively coupled to the external data processing system, communicating the monitored one or more operational variables to the external data processing system, applying the second trained machine learning-model by the external data processing system to the communicated monitored one or more operational variables so as to determine an application type, and communicating the application type and/or a set of one or more application-specific control parameters associated with the application type to the pump;

responsive to determining that the pump is not communicatively coupled to the external data processing system, applying the first trained machine-learning model by the pump to the monitored one or more operational variables so as to determine an application type.

15. A control system controlling a pump when the pump is operated in a system for moving a fluid, the control system being configured to perform the acts of the method according to claim 1.

16. A computer-implemented method for determining one or more application-specific control parameters of a pump operating in a system for moving a fluid, the method comprising the steps of:

monitoring one or more operational variables of the pump during operation of the pump in said system;

applying a trained machine-learning model to automatically determine an application type from the monitored operational variables, the application type representing a type of system the pump operates in and/or representing a type of operation performed by the pump when operating in said system, each application type being associated with a respective set of one or more application-specific control parameters;

controlling the pump based on the set of one or more application-specific control parameters associated with the determined application type, wherein the monitoring comprises monitoring the one or more operational variables over an initial period of time resulting in an initial set of monitored operational variables, wherein the applying the trained machine-learning model comprises applying the trained machine-learning model to automatically determine an initial application type from the initial set of monitored operational variables, wherein the controlling the pump comprises controlling the pump based on a set of one or more application-specific control parameters associated with the determined initial application type, and wherein the method further comprises the steps of:

monitoring the one or more operational variables of the pump during operation of the pump in said system for an extended period of time longer than the initial period of time, resulting in an extended set of monitored operational variables;

applying the trained machine-learning model to automatically determine a revised application type from the extended set of monitored operational variables; and controlling the pump based on a set of one or more application-specific control parameters associated with the determined revised application type.

17. A computer-implemented method for determining one or more application-specific control parameters of a pump operating in a system for moving a fluid, the method comprising the steps of:

monitoring one or more operational variables of the pump during operation of the pump in said system;

applying a trained machine-learning model to automatically determine an application type from the monitored operational variables, the application type representing a type of system the pump operates in and/or representing a type of operation performed by the pump when operating in said system, each application type being associated with a respective set of one or more application-specific control parameters;

controlling the pump based on the set of one or more application-specific control parameters associated with the determined application type, wherein the pump comprises a processing unit configured to implement a first trained machine-learning model; and wherein the method comprises the steps of:

determining whether the pump is communicatively coupled to an external data processing system configured to implement a second trained machine-learning model;

responsive to determining that the pump is communicatively coupled to the external data processing system, communicating the monitored one or more operational variables to the external data processing system, applying the second trained machine learning-model by the external data processing system to the communicated monitored one or more operational variables so as to determine an application type, and communicating the application type and/or a set of one or more application-specific control parameters associated with the application type to the pump; and responsive to determining that the pump is not communicatively coupled to the external data processing system, applying the first trained machine-learning model by the pump to the monitored one or more operational variables so as to determine an application type.

\* \* \* \* \*